Figure 1:
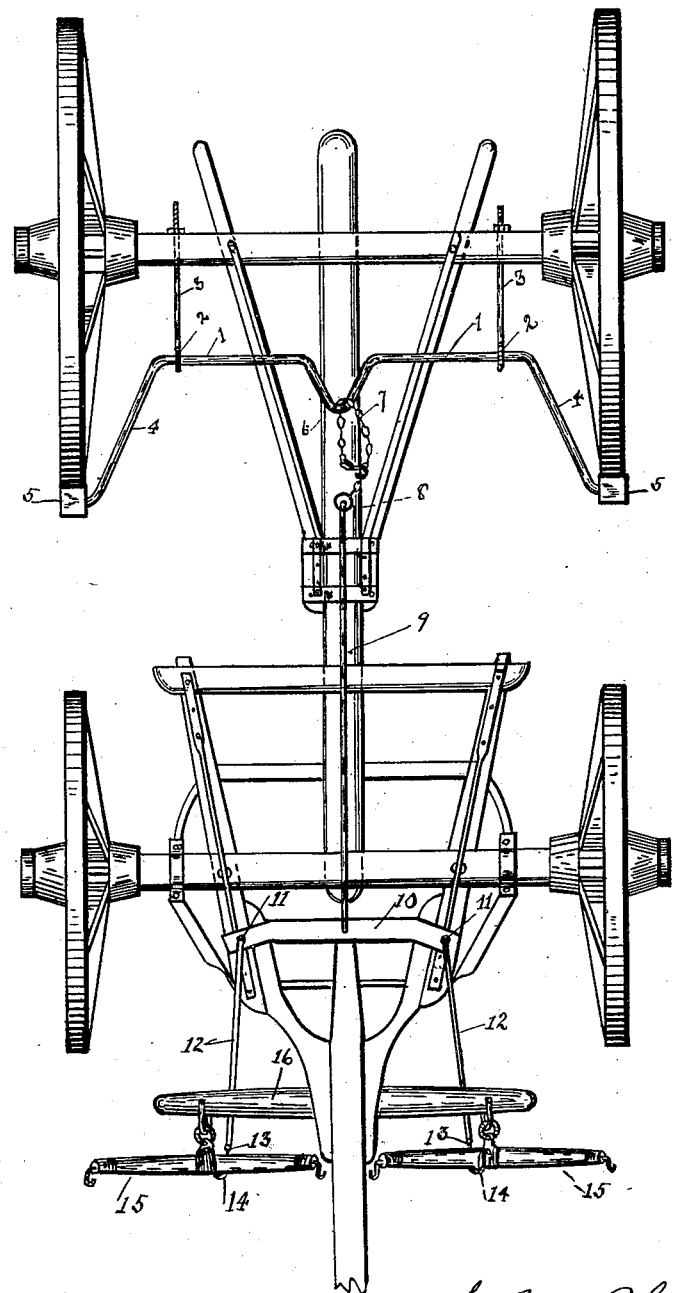

No. 690,509. Patented Jan. 7, 1902.
T. N. BLACK.
AUTOMATIC WAGON BRAKE.
(Application filed Aug. 22, 1901.)

(No Model.) 2 Sheets—Sheet 1.

Witnesses
S. A. Duffie.
R. M. Parker.

Inventor
T. N. Black
by John S. Duffie
Attorney

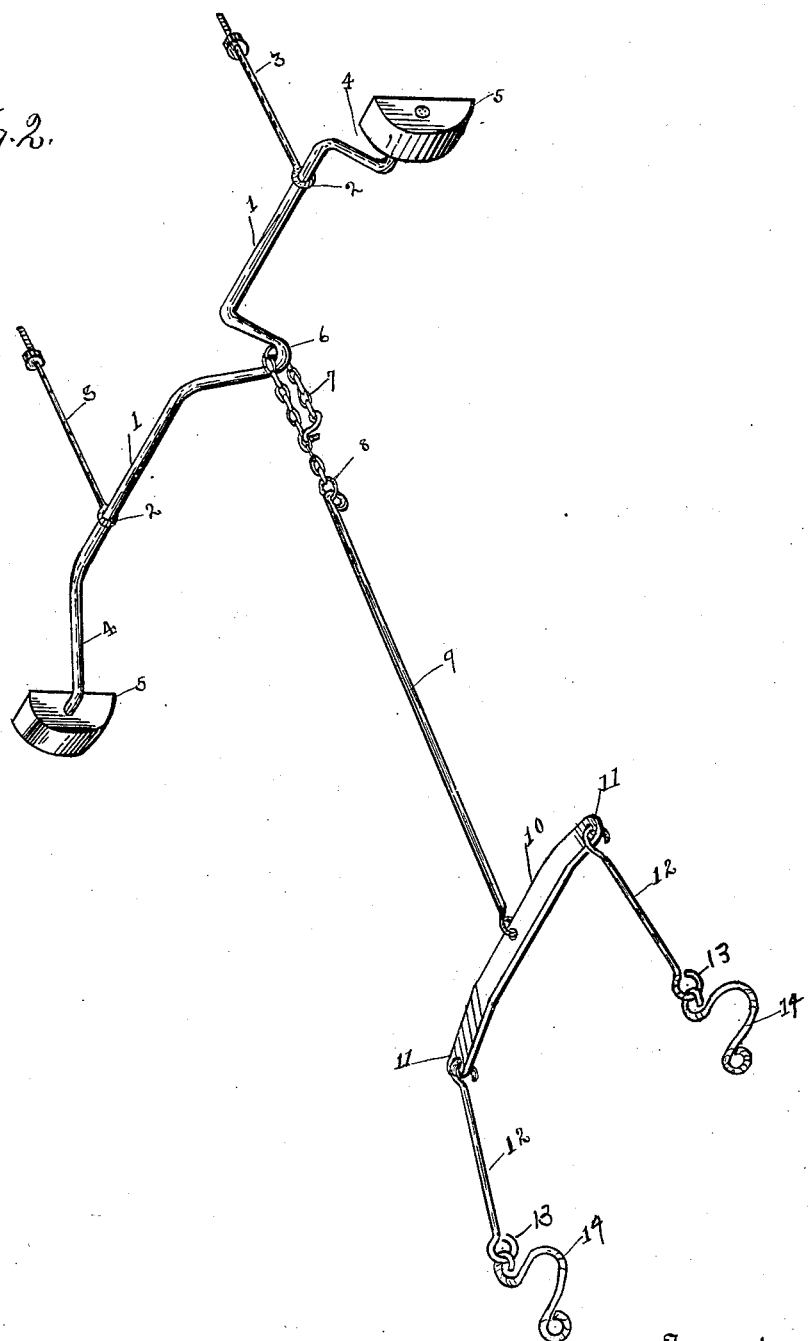

UNITED STATES PATENT OFFICE.

THOMAS N. BLACK, OF DE QUEEN, ARKANSAS.

AUTOMATIC WAGON-BRAKE.

SPECIFICATION forming part of Letters Patent No. 690,509, dated January 7, 1902.

Application filed August 22, 1901. Serial No. 72,897. (No model.)

*To all whom it may concern:*

Be it known that I, THOMAS N. BLACK, a citizen of the United States, residing at De Queen, in the county of Sevier and State of Arkansas, have invented certain new and useful Improvements in Automatic Wagon-Brakes, of which the following is a specification.

My invention is a gravity automatic wagon-brake; and it consists in a gravity-brake rod situated in front of the rear wheels, bearing brake-shoes adapted to automatically brake the wheels, and means attached to the doubletrees by which the brake-shoes are raised and the wheels released.

In the accompanying drawings, Figure 1 is a bottom plan view of a wagon with my automatic wagon-brake attached. Fig. 2 is a perspective view of the brake detached.

My invention is described as follows: 1 is the gravity-brake rod, which is pivoted in eyes 2 of rods 3, secured to the hind axle of the running-gear of the wagon. The brake-rod 1 has extending from it arms 4, which run forward and incline outwardly and upwardly, their ends bent and turned out parallel with the faces of the wagon-tires, and borne on these outward ends are brake-shoes 5. The center of this brake-rod 1 is bent backward and slightly downward, forming a U-shaped lever 6. This brake-rod 1, bowed lever, arms, and brake-shoes 5 are so balanced in the eyes 2 of the arms 3 that in their normal position the brake-shoes hang down and brake the wheels, and the lever is so set that when pulled forward the brake-shoes are thrown up, and consequently a little away from the periphery of the wheels, and they are unbraked.

Adjustably secured to the lever 6 is a chain 7, its free end secured in a ring or eye 3. Running from said eye 8 and under the coupling-tongue is a draw-rod 9, its rear end secured to the ring 8 and its front end pivoted in the center of a cross-beam 10. This cross-beam 10 has in each end perforations 11, and in each of these perforations 11 is secured the rear end of a rod 12, the front ends of these rods terminating in eyes 13. Pivotally secured to these eyes 13 are clevis-irons 14, adapted to hook over and be secured to singletrees 15 in such taut relation thereto that when the singletrees are pulled on the wagon becomes unbraked.

The operation of the automatic wagon-brake is as follows: The brake-shoes drop down by the weight of the arms of the gravity-brake rod and by their own weight and automatically lock the wagon-wheels; but when the team pulls on the singletrees 15 the cross-beam 10 is thereby pulled forward, the draw-rod 9 is thereby pulled forward, and the chain which is secured to the rear end of this draw-rod 9 and the free end of the lever 6 is also pulled forward, bringing with it the free end of said lever 6, which operation throws the arms 4 and the brake-shoes 5 upwardly and away from the wheels, and the wheels are thereby unbraked.

Having described my invention, what I claim as new, and desire to secure by Letters Patent, is—

An automatic gravity wagon-brake, consisting of rods 3, secured to the rear axle of the wagon; a gravity-brake rod 1, provided with a central lever, arms extending from each end of said rod, said gravity-brake rod journaled in the eyes of the last-mentioned rods 3; brake-shoes 5, one secured to each end of the arms, of said brake-rod and adapted to brake the rear wheels of the wagon; a chain adjustably secured to the free end of the lever of said brake-rod; a draw-rod 9, running under the coupling-tongue of the wagon, its rear end secured to the chain 7; a cross-beam 10, running under the hounds of the wagon and pivoted to said draw-rod; rods 12, having their rear ends hooked in perforations, one in each end of said cross-beam; clevis-irons 13, pivotally secured to eyes in the front ends of the last-mentioned rods, said clevis-irons adapted to hook over the singletrees, in such taut relation thereto that when the singletrees are pulled on the wagon becomes unbraked, substantially as shown and described and for the purposes set forth.

In testimony whereof I affix my signature in presence of two witnesses.

THOMAS N. BLACK.

Witnesses:
 ISAAC W. COOPER,
 ABE COLLINS.